Figure 1:
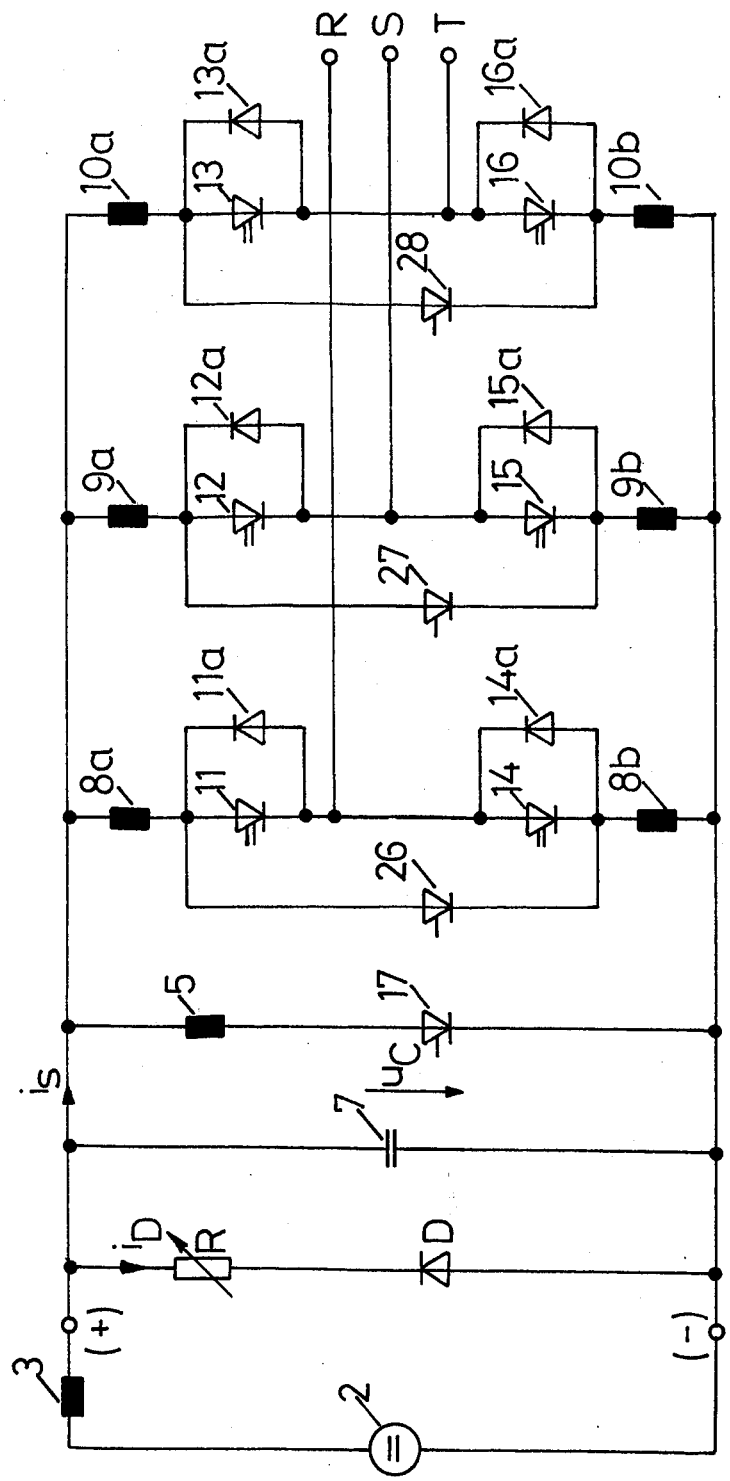

United States Patent [19]

Brenneisen

[11] 4,005,350
[45] Jan. 25, 1977

[54] ARRANGEMENT FOR PROTECTION OF SELF-CONTROLLED INVERTER FED FROM AN INTERMEDIATE D.C. VOLTAGE LINK

[75] Inventor: Jörg Brenneisen, Mannheim, Germany

[73] Assignee: BBC Brown Boveri & Company Limited, Baden, Switzerland

[22] Filed: Sept. 23, 1974

[21] Appl. No.: 508,675

[30] Foreign Application Priority Data

Sept. 29, 1973  Germany .......................... 2349161

[52] U.S. Cl. ............................................... 321/11
[51] Int. Cl.² .......................................... H02M 1/18
[58] Field of Search ......................... 321/5, 11–14; 307/252 M

[56] References Cited
UNITED STATES PATENTS

| | | | |
|---|---|---|---|
| 3,568,021 | 3/1971 | Turnbull | 321/5 X |
| 3,585,491 | 6/1971 | Petersen | 321/14 X |
| 3,832,573 | 8/1974 | Ver Planck et al. | 307/252 M X |

*Primary Examiner*—William M. Shoop
*Attorney, Agent, or Firm*—Pierce, Scheffler & Parker

[57] ABSTRACT

A self-controlled polyphase bridge type inverter utilizes controllable valves of the semi-conductor type such as thyristors in the branches of the bridge, the bridge being fed from the output of a rectifier by way of an intermediate d.c. voltage link circuit that includes at least one smoothing condenser and at least one smoothing inductance. In the event of a through-going ignition i.e. a mal-function in the inverter all controllable valves of the inverter including load valves and/or any auxiliary valves are activated simultaneously by an ignition pulse so that the smoothing condenser together with such inductances as are included in the inverter form an oscillating circuit while the valves are simultaneously ignited. In order to protect the inverter structure under such a condition, a diode in series with a resistor is connected electrically in parallel with the smoothing condenser, the diode being wired in the blocking direction relative to the normal polarity of the d.c. voltage link circuit and providing an electrically conductive connection between the poles of the smoothing condenser after the change in polarity of the condenser caused by the oscillation process beginning with the second half-cycle of the voltage.

2 Claims, 2 Drawing Figures

ARRANGEMENT FOR PROTECTION OF SELF-CONTROLLED INVERTER FED FROM AN INTERMEDIATE D.C. VOLTAGE LINK

The present invention relates to an improved arrangement for protecting a self-controlled polyphase bridge type inverter utilizing controllable valves of the semi-conductor type, i.e. thyristors, which is conventionally fed from the output of a rectifier, also of the semi-conductor type by way of an intermediate d.c. voltage link circuit, wherein the link circuit contains at least one smoothing condenser and at least one smoothing inductance and where, in the case of an ignition fault through one valve branch of the inverter bridge, all inverter valves (load valves or additional auxiliary valves) are activated simultaneously by an igniting pulse, so that the smoothing condenser in combination with the inductances of the inverter form an oscillating circuit, the inverter valves being ignited simultaneously.

The protection of the inverter in the event of faults, especially in the case of so-called through-going (Durchzundungen) ignitions, is an important problem in connection with inverters of the self-controlled type. Such through-going ignition causes the valves of a valve branch to become conductive simultaneously, thus short-circuiting the intermediate d.c. voltage link circuit which, in view of the power replenishment by the d.c. voltage source, cannot be interrupted without specific steps being taken, the reason being that the valves will remain in their conductive state so long as there is a current flow in the forward, conducting direction of the valve.

If therefore usually becomes necessary to cut off the potential of the d.c. voltage link circuit before the ignited valves are able to block again and to continue their normal operations. In the connection, the energy stored in the smoothing condenser represents a particular problem because in the case of a through-going ignition, this condenser can discharge by way of the relatively low inductances (low surge impedance), thus causing strong short-circuit currents. Since the damping factor of these oscillating circuits is relatively low, these currents will endanger the conductors as well as the valves within the circuit.

Various arrangements are known generally by means of which the condenser-stored energy, and thus the short-circuit current, can be distributed over the greatest number of main or auxiliary valve branches. These are:
 a. Ignition of all parallel load thyristors.
 b. Additional connection in parallel and ignition of by-pass thyristors.
 c. Short-circuit thyristor.

Basically, the following two different methods are being current used.

According to one method, all of the mentioned valves are ignited by a long firing impulse (sustained pulse method), with the result that the entire energy stored by the smoothing condenser will discharge through the conductors and valves of the circuit in the form of a damped oscillation, heating up these components.

According to a second method, all of the mentioned valves are ignited by a brief firing impulse which can be cut off (short pulse method), with the result that the thyristors can regain their blocking capability during the second half-cycle of the current which passes through the diodes. A positive gate voltage will then build up again at the thyristors.

The foregoing methods have the feature in common that they distribute in principle only the current discharged by the smoothing condenser over the greatest possible number of valve branches, but without reducing effectively the energy by special means other than the natural damping, always present within the circuits. However, this natural damping is usually very low, especially in the case of high-output systems.

The principal objective of the present invention is to provide an improved protective arrangement of the general type described which is capable of more quickly and effectively removing energy from the smoothing condenser, so that the second half-cycle of the current, as well as all following cycles will be damped, i.e. have a lower amplitude. This objective is accomplished in that the protective circuit is provided with an additional branch connected electrically in parallel with the smoothing condenser which becomes operative only in the event of a mal-function in the inverter valving and which comprises a diode connected in series with an ohmic resistance, the said diode being wired in the blocking direction relative to the normal polarity of the intermediate d.c. voltage link circuit, and providing an electrically conducting connection between the poles of the smoothing condenser in the event of any fault, after the change in polarity of the smoothing condenser caused by the oscillation process, during the course of thi half-cycle. In this manner, energy is removed very quickly and effectively and in simple manner from the circuit, beginning at the maximum of the first half-cycle of the current discharge (= zero voltage), with the result that all subsequent half-cycles of the current are substantially reduced in amplitude, in comparison with conventional arrangements which lack such special, additional means.

The improved protective circuit arrangement has the further advantage that the smoothing condenser will swing back to voltage values which are substantially below the starting value. This feature is especially advantageous if the above-described short pulse method is used for protection.

It is advantageous to make the resistor placed in series with the diode across the terminals of the condenser so as to be variable in value in order to enable one to set specific, pre-selected damping values for the oscillations which are generated.

Figure 2:
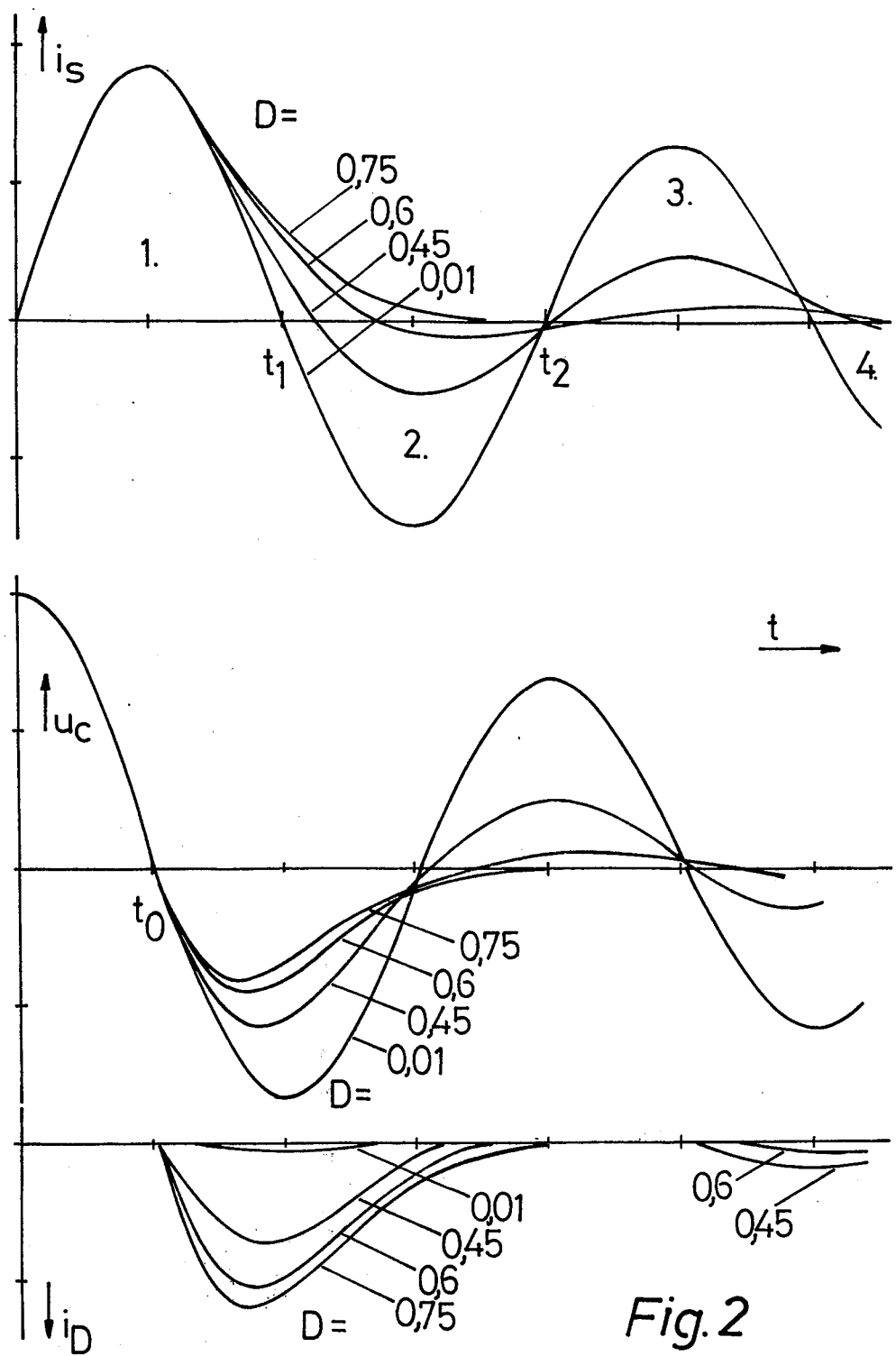

A preferred embodiment of the invention will now be explained in detail conjunction with the accompanying drawings wherein:

FIG. 1 is a schematic electrical circuit diagram of the improved protected d.c. voltage input circuit for an inverter, and FIG. 2 is a set of graphs showing the courses of the voltages and currents generated, for various damping values, i.e. for various coefficients of resistance, as the parameters.

With reference now to FIG. 1, there is seen to be illustrated a 3-phase (R,S,T,) self-controlled inverter, in the example illustrated a so-called blocking voltage-free arrangement and including the various above discussed known devices for protection against overloads, and, of course, including the improvement according to the invention. The commutation means for the various valves are not included in the drawing since they are conventional and not essential to an understanding of the invention itself. The valves located in the various branches of the inverter bridge circuit which function to carry the load are in the form of circuit-breaking thyristors 11, 12, 13, 14, 15 and 16 and these can be distinguished from other thyristor valves included in the circuit by the fact that double lines are used to designate their ignition electrode terminals. As a rule, all protective devices will not be present simultaneously in the case of the illustrated circuit diagram, but for the purpose of explanation, all such devices have been included. The output of an uncontrolled bridge type rectifier 2, for example, serves as the source of te intermediate d.c. voltage which feeds the inverter bridge comprising the load thyristors 11 to 16 connected in the various branches thereof and which function to invert the d.c. input from the intermediate circuit to a.c. at the polyphase inverter output terminals R, S and T. The circuit between the d.c. voltage source 2 and the input to the inverter bridge includes a smoothing choke 3 and a smoothing condenser 7, the choke 3 being in series with the d.c. circuit and the condenser 7 being connected in parallel. In accordance with the invention, an adjustable ohmic resistor R and a diode D form a series circuit which is connected in parallel with the smoothing condenser 7, the diode D being wired in the blocking direction in relation to the positive side (+) of the d.c. voltage source 2. Also connected in parallel with condenser 7 is a known per se protective device in the form of a short-circuiting unit consisting of an inductance 5 and a thyristor 17 arranged in series. Such a protective device is disclosed, for example, in German patent application laid open for publication No. 1,613,719, and also in an article co-authored by Heumann and Stumpe and published in the periodical "Thyristoren", 1969. pages 198,199.

In addition to the load thyristors 11–16 included in the various branches of the 3-phase inverter, each branch includes a diode connected across the load thyristor thereof in an anti-parallel manner and these diodes are numbered 11a to 16a, respectively. Also, the two load thyristors forming each phase of the inverter, include, as a further protective device, a thyristor-controlled by-pass connected in parallel therewith. Thus, thyristor 26 is arranged parallel to the two load thyristors 11, 14 related to phase terminal R, thyristor 27 is arranged parallel with load thyristors 12, 15 related to phase terminal S, and thyristor 28 is arranged parallel with load thyristors 13, 16 related to phase terminal T. Also, each phase of the inverter is provided with inductances, these being inductances 8a, 8b allocated to phase R containing load thyristors 11 and 14, inductances 9a, 9b allocated to phase S containing load thyristors 12 and 15, and inductances 10a, 10b allocated to phase T containing load thyristors 13 and 16.

The inverter circuitry operates in the following manner. The load thyristors 11 to 16 as well as the auxiliary thyristors 17 and 26 to 28 are connected to a controller of conventional design and therefore not illustrated which during normal operation of the inverter controls ignition of the load thyristors in the proper sequence to produce the 3-phase output at terminals R, S and T. However, thyristors 17, 26, 27 and 28 remain in their blocked state. Should there occur a through-going ignition, all of the load thyristors 11 and 14, 12 and 15, and 13, 16 respectively of the inverter branches will ignite simultaneously.

It is also possible, depending upon the protective devices selected, to ignite thyristor 17 of the short-circuiting unit connected parallel with smoothing condenser 7 and/or the thyristors 26, 27 and 28 in the by-passes for the paired load thyristors 11 to 16. The smoothing condenser 7 will now discharge, then change its polarity during the course of the oscillation between condenser 7 and the inductances 5, 8a, 8b, 9a, 9b and 10a, 10b, and will then again discharge in reverse direction through diodes 11a to 16a which are connected anti-parallel to the load thyristors 11 to 16. If the arrangement proposed by the invention is not present, the discharge current $i_s$ and voltage $u_c$ of the smoothing condenser will result in a value for D equaling approximately 0.01 (see run of the curve shown by FIG. 2). The current $i_s$ will be distributed over the individual parallel branches according to the ratio of the conductances. The damping of the oscillation is accomplished, for all practical purposes, only by the natural damping which is present within the circuitry. If the thyristors are ignited by means of a long-firing pulse (sustained pulse method), the result will be a poorly damped discharge oscillation of condenser 7, and FIG. 2 demonstrates that the half-cycles of the current, which follow the first half-cycle still possess substantial amplitudes. The positive half-cycles 1,3 etc. will place a load on the thyristors and the negative half-cycles 2,4 etc. will place a load on the diodes. Thus, the thyristors, as well as the diodes are under stress due to a high load integral. Especially the diodes will be endangered because they are often designed for lesser loads than the thyristors, and therefore have a lower overload capacity.

If the thyristors are ignited by a brief pulse which is then cut off (short pulse method), the load thyristors 11 to 16 will regain their blocking capability during current half-cycle 2, flowing through the diodes. The current flowing through the diodes during half-cycle 2 is, without the presence of the improvement in accordance with the present invention, usually much greater than really necessary for commutating of the load thyristors. At the point of time $t_2$ when the diode current has reached zero, the positive blocking potential, with which the smoothing condenser 7 is charged up again will build up also at the load thyristors 11 to 16. Due to the low damping of the circuit, and in the absence of the arrangement according to the present invention, the voltage will reach a magnitude equal to the operating voltage, also depicted by FIG. 2. If the protective arrangement according to the present invention is utilized, i.e. the series arranged resistor-diode combination R and D, the following advantages will accrue.

1. If a long firing pulse method is used, all valves are relieved to a great extent of the current load. This applies to the diodes as well as to the thyristors.
2. If the so-called short-pulse firing method is used, the diodes are relieved of stresses, and where the resistance R can also be set in such manner that a commutating of the load thyristors 11 to 16 is assured, and the recurring voltage to which the load thyristors are subjected is reduced to a substantial extent.

Fig. 2 shows that these advantages are obtained at the cost of one slight disadvantage, namely, that the current during the first half-cycle is somewhat longer than that which results from the known protective devices which do not include the invention. However, the increase in load caused thereby is insignificant nd is greatly outweighted by the above-mentioned advantages.

The proper size of resistor R is determined by the following criteria:
1. Damping should be as great as possible.
2. So far as dimensioning of the stress-relieving diode D is concerned, it is desirable to use a structural element of minumum size.
3. If the short-pulse firing method is utilized, commutating of the load thyristors should be ensured, and the recovery voltage at the point of time $t_2$ should be as low as possible.
4. The load increase within the thyristor during the first half-cycle, caused by lengthening of the oscillation period, should be as small as possible.

The parameters for FIG. 2 indicate that these requirements are counter-productive in part, but an acceptable compromise can be obtained by dimensioning the resistance R for a damping of $D \approx 0.5$.

The damping D is defined by the following formula:

$$D = \frac{1}{2R} \sqrt{\frac{L}{C}}$$

wherein:
C represents the capacitance of condenser 7,
L represents the sum of the inductances of the inductor components 8a, 8b, or 9a, 9b or 10a, 10b, respectively, and
R the resistance of resistor R.

In addition to the above mentioned advantages, the improved protective arrangement proposed by the invention is favorably distinguished also by its simplicity in application and by the fact that it consists of purely passive electrical components. It also offers protection, with the exception of the diodes within the inverter proper, against a wrong polar connection of the smoothing condenser 7, and which is especially important in the case wherein a condenser of the electrolytic type is utilized.

I claim:

1. Arrangement for protection of a self-controlled polyphase bridge type inverter utilizing controllable valves of the semi-conductor type such as thyristors with anti-parallel connected diodes and series connected inductances in each of the bridge branches and which is fed from the output of a rectifier by way of an intermediate d.c. voltage link circuit and wherein said link circuit includes at least one series connected smoothing inductance preceding the inverter and at least one parallel connected smoothing condenser the improvement where in the event of a throughgoing ignition fault in the valves of any one of the bridge branches which would short-circuit said d.c. voltage link circuit all controllable valves of the inverter are activated simultaneously by an ignition pulse, said smoothing condenser together with the sum of all inductances included in the converter form an oscillating circuit while all of the valves are simultaneously ignited, and wherein a diode in series with an adjustable resistor is connected electrically in parallel with said smoothing condenser, said diode being connected in the blocking direction relative to the normal polarity of the d.c. voltage link circuit and providing an electrically conducting connection between the poles of said smoothing condenser only in the event of any fault after the change in polarity of the smoothing condenser caused by the oscillation beginning with the second half-cycle of the oscillation voltage.

2. A protective arrangement as defined in claim 1 for a self-controlled polyphase bridge type inverter wherein the resistance value R of said resistor is adjusted in such manner that a damping value of $D \approx 0.5$ results, the value D being determined by the formula $$D = \frac{1}{2R} \sqrt{\frac{L}{C}}$$

wherein:
C represents the capacitance of said smoothing condenser, and
L represents the sum of the inductances included in the inverter.

* * * * *